United States Patent
Lee et al.

(10) Patent No.: US 10,045,250 B2
(45) Date of Patent: Aug. 7, 2018

(54) METHOD FOR CONFIGURING A NEW PROHIBITION BUFFER STATUS REPORTING TIMER IN A D2D COMMUNICATION SYSTEM AND DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 15/315,618

(22) PCT Filed: Jun. 29, 2015

(86) PCT No.: PCT/KR2015/006617
§ 371 (c)(1),
(2) Date: Dec. 1, 2016

(87) PCT Pub. No.: WO2016/035987
PCT Pub. Date: Mar. 10, 2016

(65) Prior Publication Data
US 2017/0201904 A1    Jul. 13, 2017

Related U.S. Application Data

(60) Provisional application No. 62/045,577, filed on Sep. 4, 2014.

(51) Int. Cl.
*H04W 4/00* (2018.01)
*H04W 28/02* (2009.01)
(Continued)

(52) U.S. Cl.
CPC ......... *H04W 28/0278* (2013.01); *H04W 4/08* (2013.01); *H04W 72/0446* (2013.01);
(Continued)

(58) Field of Classification Search
CPC .................................................. H04W 28/0278
(Continued)

(56) References Cited

U.S. PATENT DOCUMENTS

| | | | |
|---|---|---|---|
| 2012/0113922 A1* | 5/2012 | Kim | H04W 72/1284 370/329 |
| 2013/0100916 A1* | 4/2013 | Park | H04W 24/10 370/329 |
| 2013/0148580 A1* | 6/2013 | Han | H04L 47/30 370/328 |

FOREIGN PATENT DOCUMENTS

WO    2013/141600 A1    9/2013

OTHER PUBLICATIONS

ASUSTEK: "Discussion on ProSe-BSR format", R2-143547, 3GPP TSG RAN WG2 Meeting #87, Dresden, Germany, Aug. 18-22, 2014.

\* cited by examiner

*Primary Examiner* — Shripal Khajuria
(74) *Attorney, Agent, or Firm* — Dentons US LLP

(57) ABSTRACT

The present invention relates to a wireless communication system. More specifically, the present invention relates to a method and a device for configuring a new prohibition buffer status reporting timer in a D2D communication system, the method comprising: configuring with a first group of logical channel and a second group of logical channel; receiving, from a network, an indication indicating that Buffer Status Reporting (BSR) for the first group of logical channel is prohibited; and triggering a BSR for the second group of logical channel if a BSR trigger condition is met for the second group of logical channel not indicated by the indication.

14 Claims, 13 Drawing Sheets

(51) Int. Cl.
*H04W 76/02* (2009.01)
*H04W 72/04* (2009.01)
*H04W 4/08* (2009.01)
*H04W 76/04* (2009.01)
*H04W 76/14* (2018.01)
*H04W 76/27* (2018.01)

(52) U.S. Cl.
CPC ....... *H04W 76/023* (2013.01); *H04W 76/046* (2013.01); *H04W 76/14* (2018.02); *H04W 76/27* (2018.02)

(58) Field of Classification Search
USPC .......................................................... 370/329
See application file for complete search history.

FIG. 3
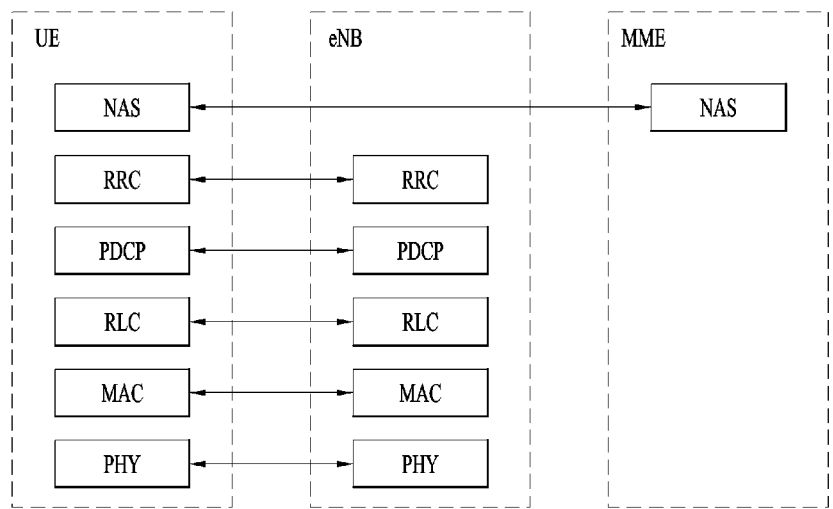
(a) Control-Plane Protocol Stack
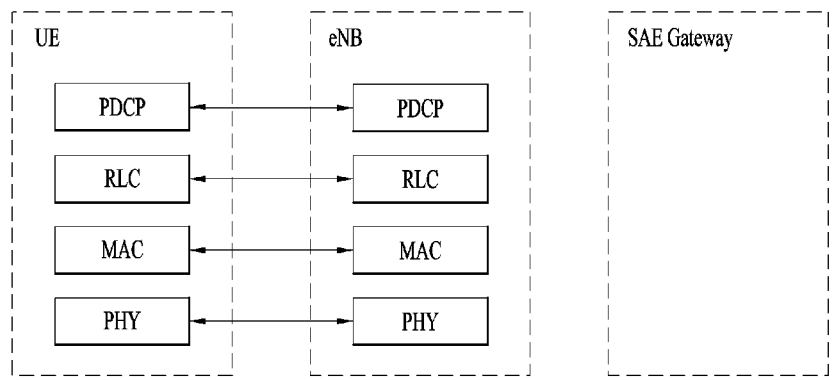
(b) User-Plane Protocol Stack

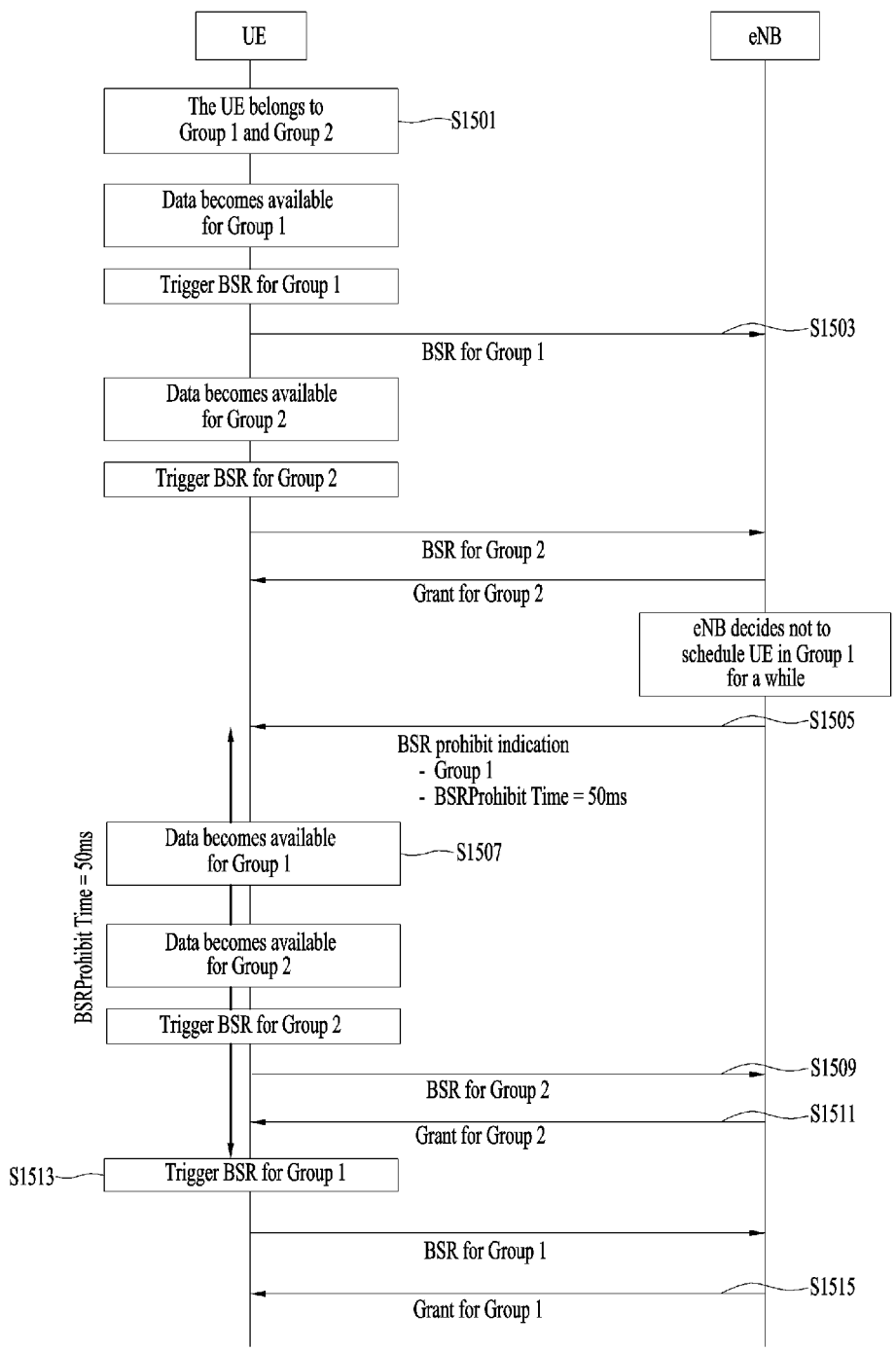

METHOD FOR CONFIGURING A NEW PROHIBITION BUFFER STATUS REPORTING TIMER IN A D2D COMMUNICATION SYSTEM AND DEVICE THEREFOR

This application is a 35 USC § 371 National Stage entry of International Application No. PCT/KR2015/006617 filed on Jun. 29, 2015, and claims priority to U.S. Provisional Application No. 62/045,577 filed on Sep. 4, 2014, all of which are hereby incorporated by reference in their entireties as if fully set forth herein.

TECHNICAL FIELD

The present invention relates to a wireless communication system and, more particularly, to a method for configuring a new prohibition buffer status reporting timer in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for a method for configuring a new prohibition buffer status reporting timer in a D2D communication system. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; the method comprising: configuring with a first group of logical channel and a second group of logical channel; receiving, from a network, an indication indicating that Buffer Status Reporting (BSR) for the first group of logical channel is prohibited; and triggering a BSR for the second group of logical channel if a BSR trigger condition is met for the second group of logical channel not indicated by the indication.

In another aspect of the present invention provided herein is an apparatus in the wireless communication system, the apparatus comprising: an RF (radio frequency) module; and a processor configured to control the RF module, wherein the processor is configured to configure with a first group of logical channel and a second group of logical channel, and to receive, from a network, an indication indicating that Buffer Status Reporting (BSR) for the first group of logical channel is prohibited, and to trigger a BSR for the second group of logical channel if a BSR trigger condition is met for the second group of logical channel not indicated by the indication.

Preferably, a BSR for the first group of logical channel is not triggered even if a BSR trigger condition is met for the first group of logical channel only.

Preferably, the first group of logical channel comprises at least one logical channel.

Preferably, the first group of logical channel consists of only sidelink logical channels.

Preferably, the method further comprises: starting a timer for the first group of logical channel when the indication is received.

Preferably, the BSR for the second group of logical channel is triggered if the BSR trigger condition is met for the second group of logical channel not indicated by the indication, while the timer for the first group of logical channel is running.

Preferably, a BSR for the first group of logical channel is not triggered if the BSR trigger condition is met for the first group of logical channel while the timer for the first group of logical channel is running.

Preferably, the BSR for the first group of logical channel is triggered if data is available for the first group of logical channel when the timer for the first group of logical channel expires.

Preferably, the first group of logical channel and the second group of logical channel are identified by at least one of a group identifier, a destination identifier, or a group index, which is known to both of the UE and the network.

Preferably, the indication is received via Physical layer (PHY), Medium Access Control (MAC), Radio Resource Control (RRC) signaling from the network.

Preferably, the indication includes at least one of an UE identifier, a group identifier, a destination identifier, a group index which identifies each groups, BSR type or value of a timer.

Preferably, the BSR type comprises Proximity based Services (ProSe) BSR or Legacy BSR, wherein the ProSe BSR is to inform a network of an amount of data available for transmission over PC5 interface.

Preferably, the timer is configured as per each UE, per each group, or per each BSR type.

Preferably, the timer is running during a certain period of time, wherein the certain period of time is defined as a number of subframes, or time duration, or number of BSR trigger.

It is to be understood that both the foregoing general description and the following detailed description of the present invention are exemplary and explanatory and are intended to provide further explanation of the invention as claimed.

Advantageous Effects

According to the present invention, configuring a new prohibition buffer status reporting timer can be efficiently performed in a D2D communication system. Specifically, a network can inform the UE of the network's scheduling policy using the new prohibition buffer status reporting timer to aim at preventing frequent transmission of BSR.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 15 is an example for configuring a new prohibition buffer status reporting timer for each group according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (TDD) scheme in the present specification, the embodiments of the present invention may be easily modified and applied to a half-duplex FDD (H-FDD) scheme or a time division duplex (TDD) scheme.

Figure 1:
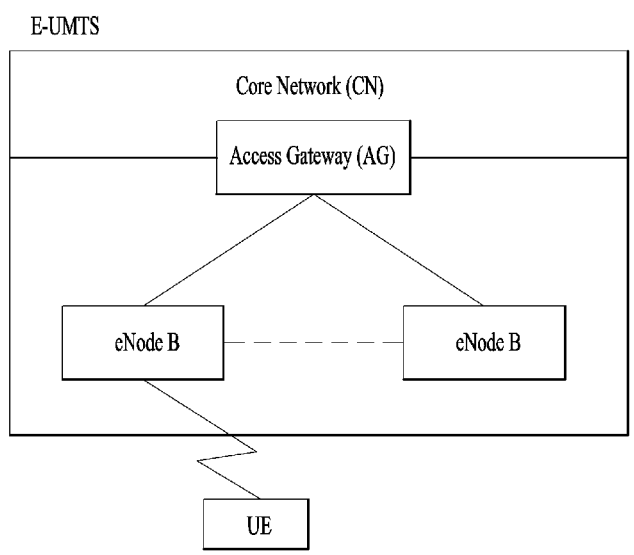
FIG. 1 is a diagram showing a network structure of an Evolved Universal Mobile Telecommunications System (E-UMTS) as an example of a wireless communication system.
Figure 2A:
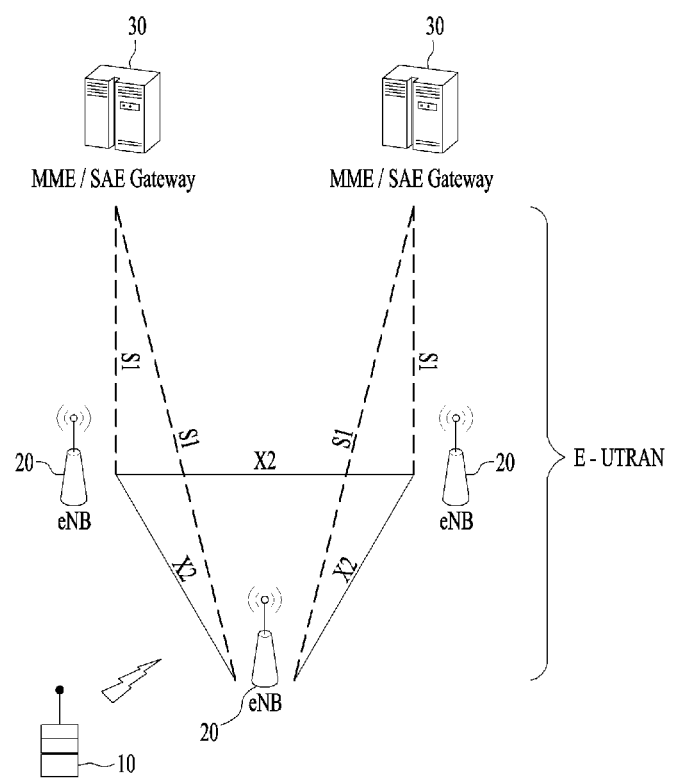
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
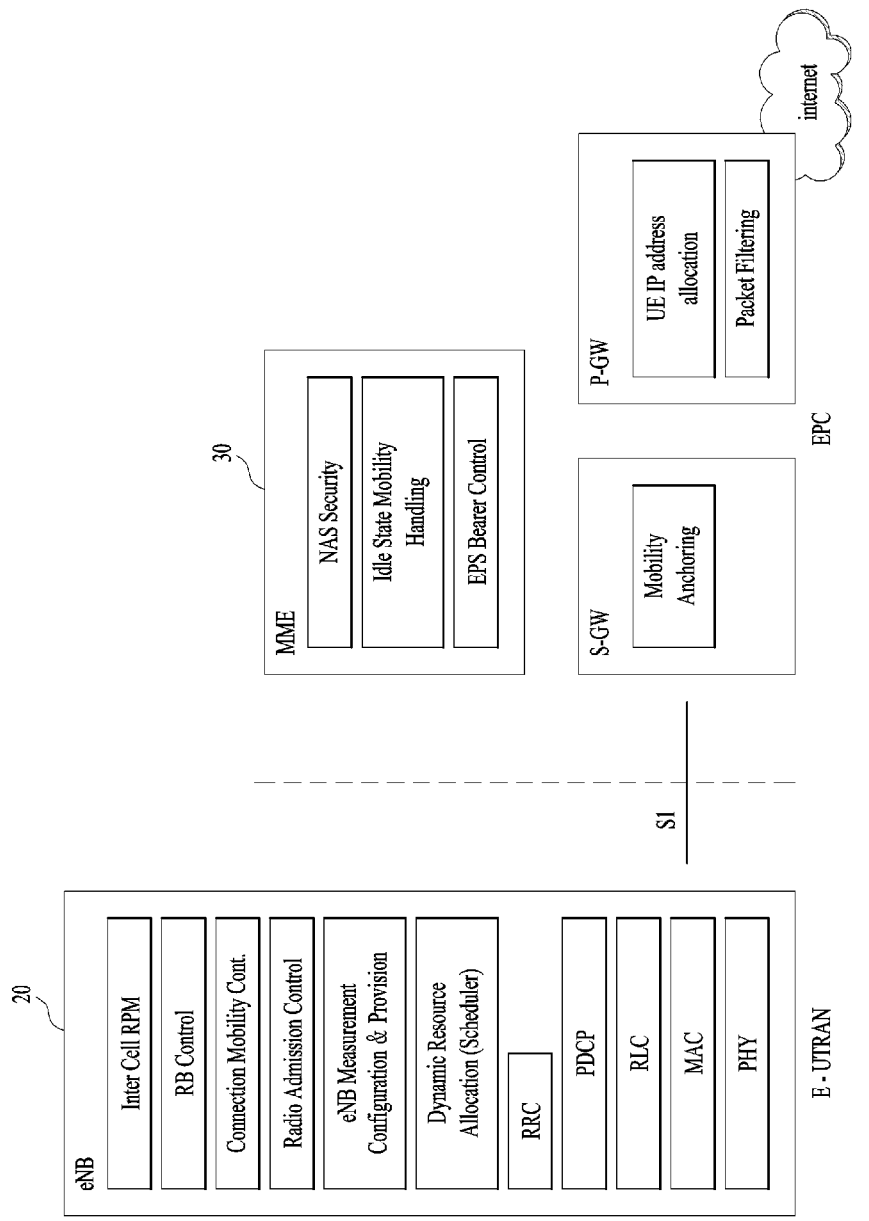
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
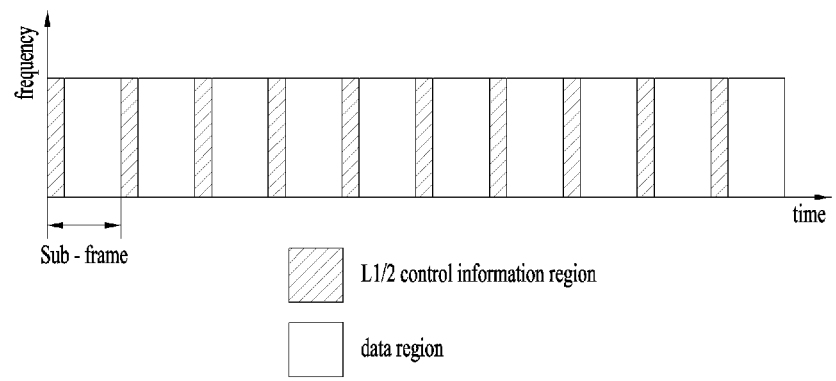
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
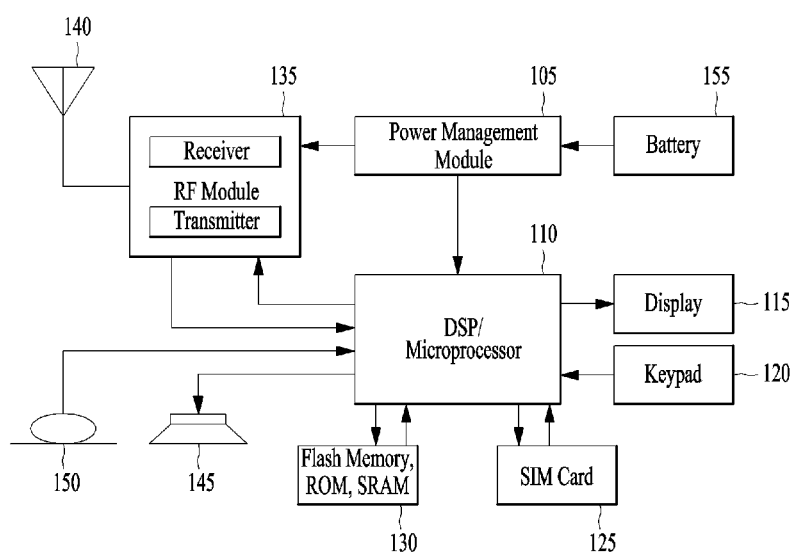
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
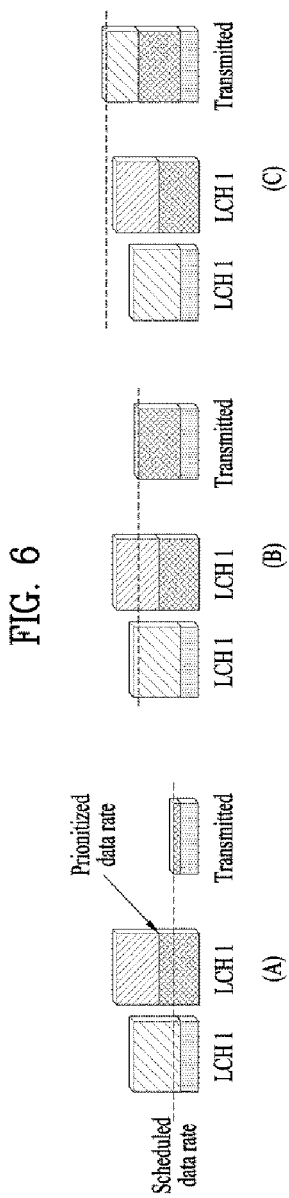
FIG. 6 is a diagram for prioritization of two logical channels for three different uplink grants.

FIG. 6 is a diagram for prioritization of two logical channels for three different uplink grants.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the buffer is empty. This is illustrated in FIG. 6.

Regarding FIG. 6, it may be assumed that a priority of the logical channel 1 (LCH 1) is higher than a priority of the logical channel 2 (LCH 2). In case of (A), all prioritized data of the LCH 1 can be transmitted and a portion of prioritized data of the LCH 2 can be transmitted until amount of the scheduled data rate. In case of (B), all prioritized data of the LCH 1 and all prioritized data of the LCH 2 can be transmitted. In case of (C) all prioritized data of the LCH 1 and all prioritized data of the LCH 2 can be transmitted and a portion of data of the LCH 1 can be further transmitted.

Figure 7:
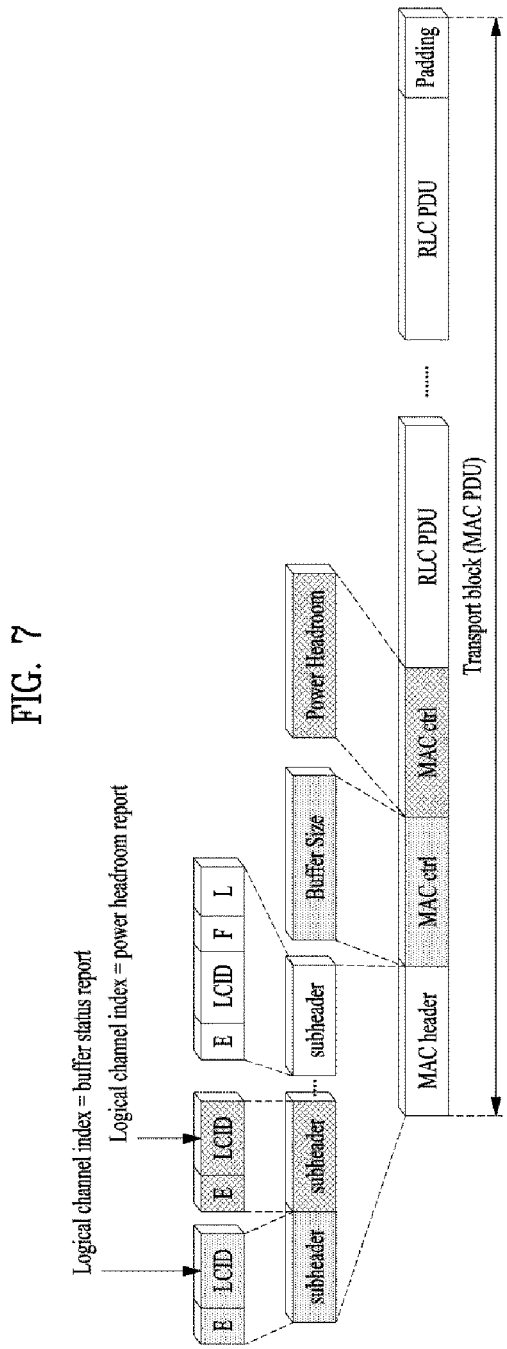
FIG. 7 is a diagram for signaling of buffer status and power-headroom reports.

FIG. 7 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 7.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

In summary, the BSR is triggered in any of the following situation:

i) when data arrive for a logical channel which has higher priority than the logical channels whose buffers are not empty;

ii) when data become available for the UE's buffer, which is empty;

iii) when the retxB SR-Timer expires and there is still data in the UE's buffer;

iv) when a periodicBSR-Timer expires; or v) when the remaining space in a MAC PDU can accommodate a BSR.

Figure 8:
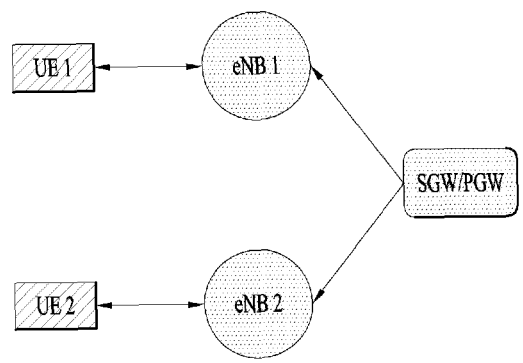
FIG. 8 is an example of default data path for a normal communication.

FIG. 8 is an example of default data path for communication between two UEs. With reference to FIG. 8, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 9:
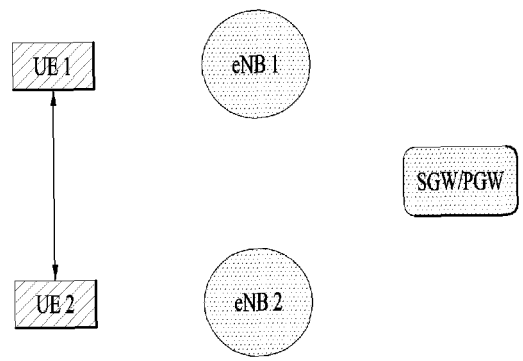
FIGS. 9 and 10 are examples of data path scenarios for a proximity communication.
Figure 10:
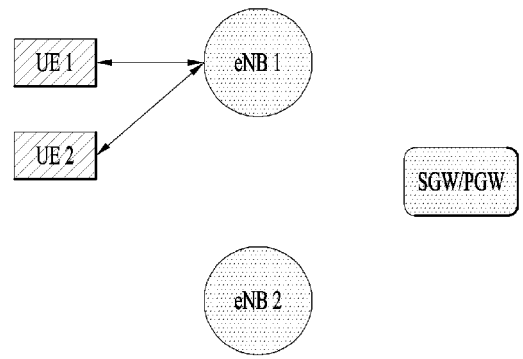

FIGS. 9 and 10 are examples of data path scenarios for a proximity communication. If wireless devices (e.g., UE1, UE2) are in proximity of each other, they may be able to use a direct mode data path (FIG. 9) or a locally routed data path (FIG. 10). In the direct mode data path, wireless devices are connected directly each other (after appropriate procedure(s), such as authentication), without eNB and SGW/PGW. In the locally routed data path, wireless devices are connected each other through eNB only.

Figure 11:
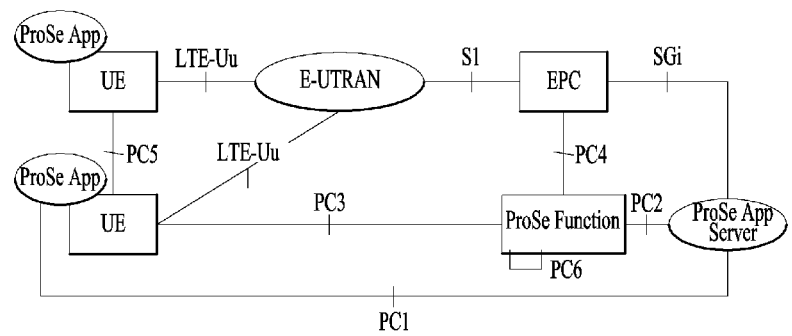
FIG. 11 is a conceptual diagram illustrating for a non-roaming reference architecture.

FIG. 11 is a conceptual diagram illustrating for a non-roaming reference architecture. PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

Especially, the following identities are used for ProSe Direct Communication:

Source Layer-2 ID identifies a sender of a D2D packet at PC5 interface. The Source Layer-2 ID is used for identification of the receiver RLC UM entity;

Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

In summary, for the PC5 interface, there are several features as following:

i) The Source Layer-2 ID and the Destination Layer-2 ID in front of the MAC PDU without MAC subheader, ii) It is too early to exclude MAC CE for D2D, iii) One D2D group can be composed of UEs supporting different MAC PDU formats, iv) Include a MAC PDU format version number in the first field of D2D MAC PDU, v) Separate HARQ entity for D2D.

On the other hand, for the Uu interface, there are several features different from the PC5 interface as following:

i) It might be beneficial for the network to know which buffer status information is mapped to which D2D communication groups of a UE, ii) Group Index is informed to the eNB by BSR (either explicit or implicit), iii) The eNB is aware of Group ID, and mapping relation between Group ID and Group Index, and iv) The UE reports Group ID, and mapping relation between Group ID and Group Index to the eNB.

Figure 12A:
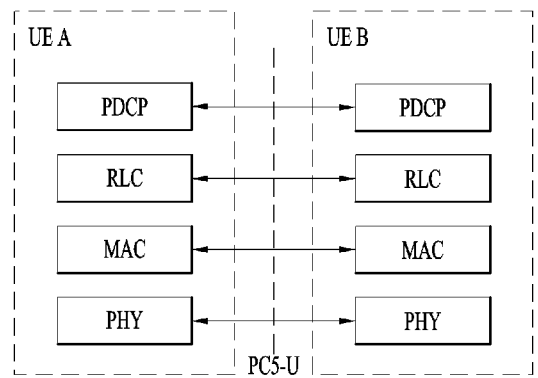
FIG. 12a is a conceptual diagram illustrating for User-Plane protocol stack for ProSe Direct Communication.
Figure 12B:
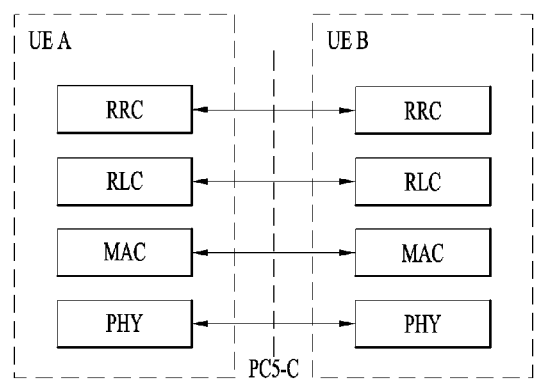
FIG. 12b is Control-Plane protocol stack for ProSe Direct Communication.

FIG. 12a is a conceptual diagram illustrating for User-Plane protocol stack for ProSe Direct Communication, and FIG. 12b is Control-Plane protocol stack for ProSe Direct Communication.

FIG. 12a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) There is no HARQ feedback for ProSe Direct Communication, ii) MAC sub header contains LCIDs (to differentiate multiple logical channels), iii) The MAC header comprises a Source Layer-2 ID and a Destination Layer-2 ID, iv) At MAC Multiplexing/demultiplexing, priority handling and padding are useful for ProSe Direct communication, v) RLC UM is used for ProSe Direct communication, vi) Segmentation and reassembly of RLC SDUs are performed, vii) A receiving UE needs to maintain at least one RLC UM entity per transmitting peer UE, viii) An RLC UM receiver entity does not need to be configured prior to reception of the first RLC UM data unit, and ix) U-Mode is used for header compression in PDCP for ProSe Direct Communication.

A UE may establish multiple logical channels. LCID included within the MAC subheader uniquely identifies a logical channel within the scope of one source Layer-2 ID and Destination Layer-2 ID combination. All logical channels are mapped to one specified logical channel group (e.g.

LCGID 3). It is up to the UE implementation in which order to serve the logical channels. Parameters for Logical channel prioritization are not configured FIG. 12b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a ProSe Direct communication.

Figure 13:
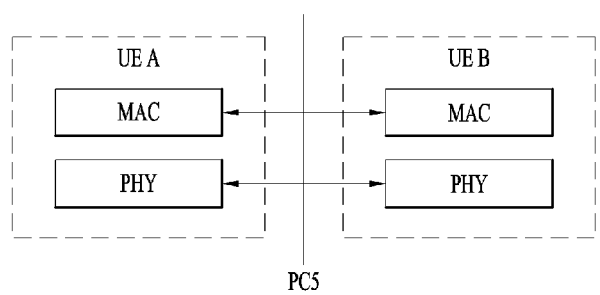
FIG. 13 is a conceptual diagram illustrating for a PC5 interface for device to device direct discovery.

FIG. 13 is a conceptual diagram illustrating for a PC5 interface for device to device direct discovery.

ProSe Direct Discovery is defined as the procedure used by the ProSe-enabled UE to discover other ProSe-enabled UE(s) in its proximity using E-UTRA direct radio signals via PC5. ProSe Direct Discovery is supported only when the UE is served by E-UTRAN.

Upper layer handles authorization for announcement and monitoring of discovery information. Content of discovery information is transparent to Access Stratum (AS) and no distinction in AS is made for ProSe Direct Discovery models and types of ProSe Direct Discovery.

The UE can participate in announcing and monitoring of discovery information in both RRC_IDLE and RRC_CONNECTED state as per eNB configuration. The UE announces and monitors its discovery information subject to the half-duplex constraint.

Announcing and Monitoring UE maintains the current UTC time. Announcing UE transmits the discovery message which is generated by the ProSe protocol taking into account the UTC time upon transmission of the discovery message. In the monitoring UE the ProSe protocol provides the message to be verified together with the UTC time upon reception of the message to the ProSe function.

The Radio Protocol Stack (AS) for ProSe Direct Discovery consists of only MAC and PHY.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

In ProSe communication, a UE can belong to multiple Groups and there could be many UEs in a Group. Then, for a Group, it is possible that multiple UEs request resource for the data transmission of the Group at the same time. Given that the UE may have a half-duplex restriction in ProSe communication, the eNB would schedule in a way that only one UE transmits data in a Group at a point in time in order to avoid collision between transmission and reception. For this, the eNB may delay scheduling of the UE for some specific Group for a period of time duration. As a result, although the UE sends a BSR for resource request to transmit data for a Group, the UE may not be able to receive the grant for the Group for a while.

In addition, it is also possible that the UE doesn't to receive the grant for the Group if the BSR transmission fails so that the eNB doesn't receive the request from the UE. From the UE point of view, the UE is not able to distinguish which case happens in the eNB side, i.e., scheduling is delayed due to scheduling policy or eNB doesn't receive the BSR. Accordingly, the UE will keeps retransmission of the BSR for the same Group if the UE doesn't get resource for the data transmission of the Group from the eNB. Considering that the UE may transmit the BSR of only one Group at a given time, this may reduce the opportunity of transmitting the BSR of another Group, of which the eNB would provide the resource for transmission, and result in inefficient use of resource.

Currently, there is no mechanism to inform the UE of eNB's scheduling policy. Thus, the UE cannot stop or pause retransmitting the BSR of a Group until the UE receives the grant for data transmission of the Group. Note that even though current Scheduling Request mechanism provides prohibition of triggering of SR by sr-ProhibitTimer, but this only aims at preventing frequent transmission of SR and does not distinguish different Groups within a UE.

Figure 14:
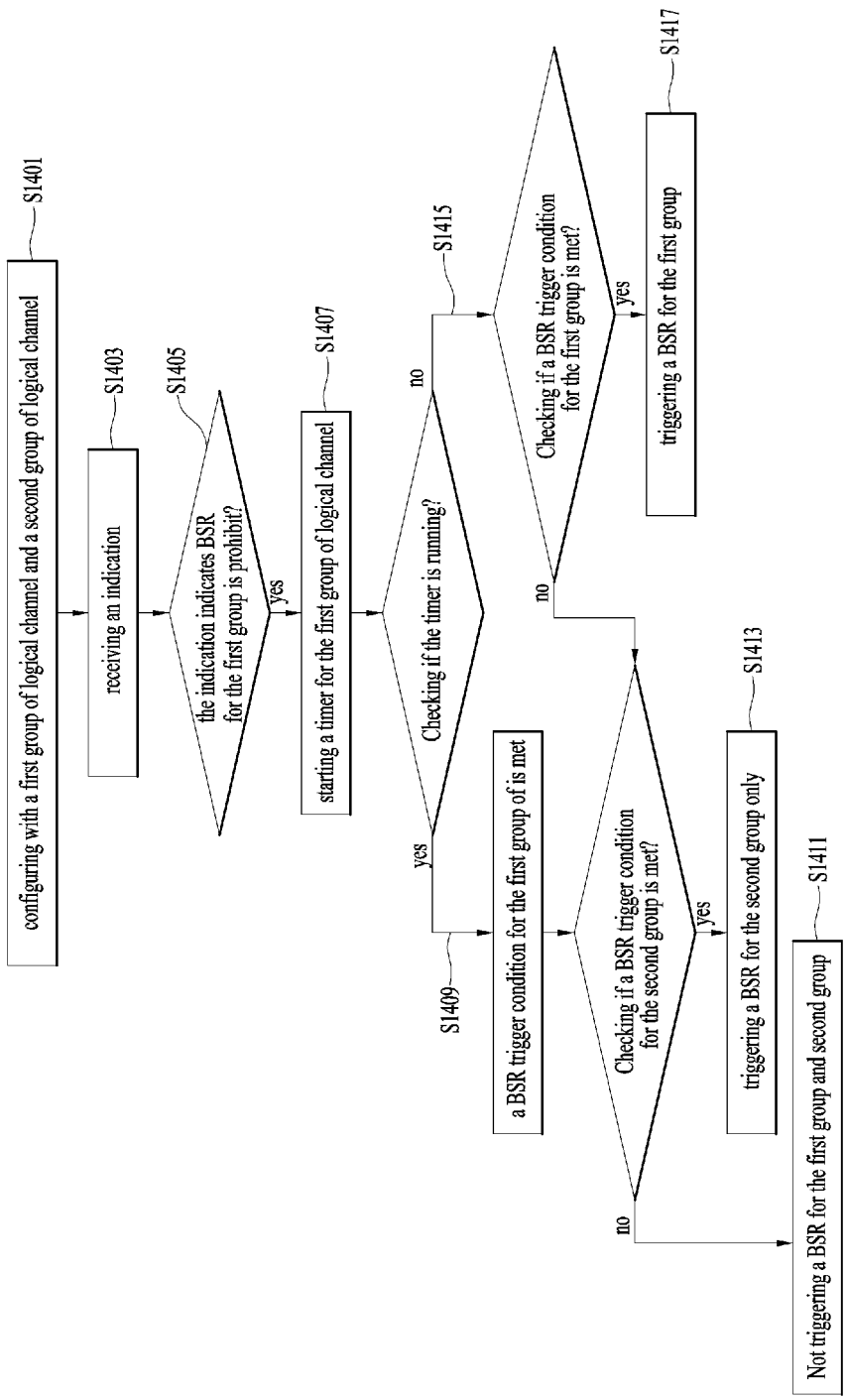
FIG. 14 is a conceptual diagram for configuring a new prohibition buffer status reporting timer for each group according to embodiments of the present invention.

FIG. 14 is a conceptual diagram for configuring a new prohibition buffer status reporting timer for each group according to embodiments of the present invention.

In this invention, the UE is prohibited from triggering and transmitting a BSR of at least one group by receiving a BSR prohibit indication from the network. The UE resumes triggering and transmitting the BSR of the group after a period of time duration. For this, the network sends the BSR prohibit indication indicating that the UE does not trigger and it the BSR of the indicated Group for a period of time duration.

A UE belongs to at least one group when the UE communicates with other UEs directly over the PC5 interface (S1401)

Preferably, the group is defined as below: i) A set of the logical channels (or UEs) with the same target of the packet, which is identified by the group identifier; ii) A set of the logical channels (or UEs) with the same target of the packet, which is identified by the destination Identifier; iii) A set of the logical channels (or UEs) with the same target of the packet, which is identified by the pair of source identifier and destination identifier, or iv) A set of the logical channels (or UEs) with the group index which is mapped to the same group identifier, e.g., Logical Channel Group ID can be used as the Group Index.

The group is identified by a group identifier, a destination identifier, or group index, which is known to both of the UE and the network.

If the UE configures with a first group of logical channel and a second group of logical channel when the UE communicates with other UEs directly, the network transmits the BSR prohibit indication by at least one of PHY, MAC, or RRC signaling (S1403).

Preferably, the first and second groups of logical channel comprise at least one logical channel.

Preferably, the first group of logical channel consists of only sidelink logical channels, and the second group of logical channel consists of only uplink logical channel, and vice versa.

Preferably, the BSR prohibit indication includes at least one of an UE identifier, a group identifier, a destination identifier, a group index which identifies each groups, BSR type or value of a BSR-prohibitTimer.

Preferably, the BSR type comprises a ProSe BSR or a Legacy BSR. The ProSe BSR is to inform the network of the amount of data available for transmission over PC5 interface. And the Legacy BSR is to inform the network of the amount of data available for transmission over Uu interface.

Alternatively, the BSR-prohibitTimer can be pre-defined for the UE and the network.

When the BSR prohibit indication is received from the network, the UE starts BSR-prohibitTimer according to the BSR prohibit indication.

The BSR-prohibitTimer is configured as i) per each UE (i.e., one BSR-prohibitTimer for a UE), or ii) per each group (i.e., one BSR-prohibitTimer for each Group), or iii) per each BSR type (one BSR-prohibitTimer for each BSR Type).

For example, if the BSR prohibit indication indicates that BSR for the first group of logical channel is prohibited (S1405), the BSR-prohibitTimer for the first group starts when the indication is received (S1407).

Preferably, the BSR Prohibit Time is a period of time duration and defined as i) number of subframes (e.g., 10 subframes), ii) time duration (e.g., 10 ms), or iii) number of BSR trigger (e.g., 10 times).

While the BSR-prohibitTimer for the first group of logical channel is running (S1409), even though the BSR trigger condition is met for the first group of logical channel, the UE does not trigger a BSR for the first group of logical channel (S1411).

In this case, if the BSR trigger condition is met for the second group of logical channel not indicated by the indication, while the BSR-prohibitTimer for the first group of logical channel is running, the UE triggers a BSR for the second group of logical channel (S1413).

Meanwhile, when the BSR-prohibitTimer expires (S1415), if the BSR trigger condition is met for the first group of logical channel, the UE triggers a BSR for the first group of logical channel (S1417).

When the BSR-prohibitTimer expires (S1415), if the BSR trigger condition for the first group of logical channel is not met and if the BSR trigger condition is met for the second group of logical channel, the UE can triggers the BSR for the second group of logical channel (S1413). And if the BSR trigger condition for the second group of logical channel is not also met, the UE does not trigger a BSR for the first and second groups of logical channel (S1411).

When the UE receives the BSR prohibit indication from the network, if the BSR-prohibitTimer is not running, the UE starts the BSR-prohibitTimer and if the BSR-prohibitTimer is running, the UE restart the BSR-prohibitTimer.

The UE can check the BSR trigger condition: i) whether data is available for all logical channels configured for the UE or not, ii) whether data is available for logical channels in a Group indicated by the BSR prohibit indication or not, or iii) whether data is available for the logical channels associated with the BSR Type indicated by the BSR prohibit indication. If the BSR trigger condition for a UE is met, if BSR-prohibitTimer is running, the UE does not trigger the BSR. And if BSR-prohibitTimer is not running, the UE triggers the BSR.

If the BSR trigger condition for a Group is met, if BSR-prohibitTimer for the Group is running, the UE does not trigger the BSR for the Group. If BSR-prohibitTimer for the Group is not running, the UE triggers the BSR for the Group.

If the BSR trigger condition for a ProSe BSR is met, if BSR-prohibitTimer for the ProSe BSR is running, the UE does not trigger the ProSe BSR. And if the BSR-prohibitTimer for the ProSe BSR is not running, the UE triggers the BSR ProSe BSR.

Meanwhile, in view of the UE, regardless of BSR-prohibitTimer, the UE can trigger BSR if the BSR trigger condition is met. In this case, the UE can control to transmit the triggered BSR according to the BSR prohibit indication.

If the BSR is triggered because the condition is met, if BSR-prohibitTimer is running due to the BSR prohibit indication, the UE does not send the BSR. If BSR-prohibitTimer is not running, the UE sends the BSR.

If the BSR for a group is triggered because the condition is met, if BSR-prohibitTimer for the Group is running due to the BSR prohibit indication, the UE does not send the BSR for the group. And if BSR-prohibitTimer for the Group is not running, the UE sends the BSR for the group.

If the ProSe BSR is triggered because the condition is met, if BSR-prohibitTimer for the ProSe BSR is running due to the BSR prohibit indication, the UE does not send the ProSe BSR. And if BSR-prohibitTimer for the ProSe BSR is not running, the UE sends the ProSe BSR.

When the BSR-prohibitTimer expires, the UE sends the BSR if the BSR is triggered while the BSR-prohibitTimer is running; or the UE triggers the BSR regardless of whether the UE has data available for transmission; or the UE triggers the BSR if the UE has data available for transmission.

The UE checks whether the UE has data available for transmission for any logical channels configured for the UE, or any logical channels which belong to the Group of which the BSR-prohibitTimer expirer, or any logical channels associated with the BSR Type.

FIG. 15 is an example for configuring a new retransmission buffer status reporting timer for each group according to embodiments of the present invention.

There are UE1 and UE2, which are communicating with other UEs via PC5 interface. UE1 belongs to Group 1 and UE2 belongs to Group 1 and Group 2 (S1501).

The data of Group1 becomes available for transmission. The UE triggers the BSR for Group1 and transmits the BSR for Group1 to the network (S1503).

The network doesn't provide the grant for the UE to transmit data of Group1 because Group1 is congested and other UEs are prioritized over this UE in Group1. The network sends BSR prohibit indication to the UE, which indicates that the UE is prohibited to trigger BSR for Group1 for 50 ms (S1505).

During 50 ms after reception of the BSR prohibit indication, the data of Group1 becomes available for transmission (S1507). However, the UE does not trigger the BSR for Group1 as it is prohibited by the network.

During 50 ms after reception of the BSR prohibit indication, the data of Group2 becomes available for transmission. The UE triggers the BSR for Group2 and transmits the BSR for Group2 to the network (S1509). Accordingly, the network would give the grant for Group2 data transmission to the UE (S1511).

At the moment 50 ms is passed after reception of the BSR prohibit indication, the UE triggers BSR for Group1 (S1513). The UE transmits the BSR for Group1 to the network and the network would give the grant for Group1 data transmission to the UE (S1515).

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   configuring with a first group of logical channel and a second group of logical channel;
   receiving, from a network, an indication indicating that Buffer Status Reporting (BSR) for the first group of logical channel is prohibited; and
   triggering a BSR for the second group of logical channel if a BSR trigger condition is met for the second group of logical channel not indicated by the indication.

2. The method according to claim 1, wherein a BSR for the first group of logical channel is not triggered even if a BSR trigger condition is met for the first group of logical channel only.

3. The method according to claim 1, wherein the first group of logical channel comprises at least one logical channel.

4. The method according to claim 1, wherein the first group of logical channel consists of only sidelink logical channels.

5. The method according to claim 1, further comprising:
   starting a timer for the first group of logical channel when the indication is received.

6. The method according to claim 5, the BSR for the second group of logical channel is triggered if the BSR trigger condition is met for the second group of logical channel not indicated by the indication, while the timer for the first group of logical channel is running.

7. The method according to claim 5, wherein a BSR for the first group of logical channel is not triggered if the BSR trigger condition is met for the first group of logical channel while the timer for the first group of logical channel is running.

8. The method according to claim 7, the BSR for the first group of logical channel is triggered if data is available for the first group of logical channel when the timer for the first group of logical channel expires.

9. The method according to claim 1, wherein the first group of logical channel and the second group of logical channel are identified by at least one of a group identifier, a destination identifier, or a group index, which is known to both of the UE and the network.

10. The method according to claim 1, wherein the indication is received via Physical layer (PHY), Medium Access Control (MAC), Radio Resource Control (RRC) signaling from the network.

11. The method according to claim 1, wherein the indication includes at least one of an UE identifier, a group identifier, a destination identifier, a group index which identifies each groups, BSR type or value of a timer.

12. The method according to claim 11, wherein the BSR type comprises Proximity based Services (ProSe) BSR or Legacy BSR, wherein the ProSe BSR is to inform a network of an amount of data available for transmission over PC5 interface.

13. The method according to claim 5, wherein the timer is configured as per each UE, per each group, or per each BSR type.

14. The method according to claim 5, wherein the timer is running during a certain period of time, wherein the certain period of time is defined as a number of subframes, or time duration, or number of BSR trigger.

\* \* \* \* \*